455-602 AU 233 EX

FIP8106 XR 3,808,366

United States Patent [19]

Wanamaker et al.

[11] 3,808,366

[45] Apr. 30, 1974

[54] BINARY DATA TRANSMISSION SYSTEM

[75] Inventors: Chris M. Wanamaker, Milford; Robert F. Nuss, Jr., Shelton, both of Conn.

[73] Assignee: General Signal Corporation, Rochester, N.Y.

[22] Filed: Dec. 11, 1972

[21] Appl. No.: 313,734

[52] U.S. Cl. .................. 178/68, 250/199, 325/38 R

[51] Int. Cl. ........................................... H04l 15/00

[58] Field of Search .......... 178/66, 67, 68; 250/199; 325/38 R, 30, 320; 340/347 R

[56] References Cited

UNITED STATES PATENTS 3,501,704 3/1970 Teitelbaum ...................... 178/66 R

*Primary Examiner*—Albert J. Mayer

*Attorney, Agent, or Firm*—Milton E. Kleinman; Harold S. Wynn

[57] ABSTRACT

A receiver for receiving binary data from a transmission line is disclosed. Binary data is transmitted by a return to zero polarity reversal scheme. That is, one of the digits of the binary pair is transmitted when there is a polarity difference in a first direction between the lines and the other digit of the binary pair is transmitted when there is a polarity difference in an opposite direction between the lines. The lines return to a zero potential difference between successive codes even when successive codes are identical. Polarity sensitive sensing devices are used to detect and respond to potential differences and potential equality between the lines of the transmission line. A gate is coupled to the sensing devices for providing an individual output signal in response to each return to zero line condition. Other gates are coupled to the sensing devices, and each other, in such a manner that they uniquely respond to a potential difference, in a first direction, between the lines of the transmision line and preserve their respective unique response until such time as a potential difference, in an opposite direction, exists between the lines of the transmission line. The unique response is preserved irrespective of the fact that the potential between the lines may return to zero. The gate which responds to return to zero potential provides synchronization signals.

9 Claims, 2 Drawing Figures

BINARY DATA TRANSMISSION SYSTEM

BACKGROUND OF THE INVENTION

While the invention is subject to a wide range of applications, it is particularly suited for use in a code communicating system and will be described in connection with such setting. More specifically, the invention is particularly suited for use in a receiver section of a code communication system.

When a code transmitter and receiver have physical locations which are reasonably close together it is economical and expedient to provide numerous interconnections for providing bi-directional control signals. However, when the transmitter and receiver are situated at considerable distances from each other, it is desirable to provide a single transmission path for communicating all intelligence signals, and any necessary control signals, from the transmitter to the receiver. One of the most important control signals that it is necessary to receive at the receiving station is a synchronizing signal. That is, the receiving station must have some means for identifying successive signals and to determine if they are, in fact, successive signals or an excessively long single signal. One common technique for providing this information has been to provide carefully synchronized clock pulses at each end and have the receiving equipment sample the line conditions at a point midway between successive clock pulses. Another well known and widely used technique involves a self-synchronizing return to zero coding system. The code transmission scheme of the present invention transmits binary data in the form of a return to zero pulse train with differential polarity reversal used to distinguish between the two digits of the binary system which are usually referred to either as ones and zeros or marks and spaces.

SUMMARY OF THE INVENTION

The code receiving portion of a code communication system is disclosed. The input to the code receiver is from a transmission channel which, at the input to the receiver, comprises two lines. A code indicative of one of the binary digits is formed when there is a potential difference in a predetermined direction between the two lines. A code indicative of the other one of the binary digits is formed when there is a potential difference, in the opposite direction, between the two lines of the transmission line. Between successive digits, whether they be identical or different from the preceding digit, the potential difference between the lines of the transmission line returns to zero. This may mean that both lines of the transmission line go to the same positive potential, or that both go to the same negative potential. Polarity sensing detectors are bridged across the transmission line to detect when there is a potential difference between the lines and to determine the direction of the potential difference. These devices may typically comprise optical couplers. The outputs of the phototransistors are coupled to NAND gate so that the NAND gate will produce a change at its output each time the potential difference between the lines returns to zero and when there is a change in the potential difference in either direction between the lines of the transmission line. Another pair of NAND gates is provided with each one having one input from one or the other of the phototransistors. A second input to each of these NAND gates is derived from the output of the other. The connections are such that one of the pair of NAND gates provides a "true" output signal when one of the binary digits has been received; and the other one of the pair of NAND gates provides a "true" output signal when the other one of the binary digits has been received at the receiver. Once a binary signal has been received and the NAND gates have been set to an indication of the received digit, the NAND gates will remain latched in that condition until such time as an indication of a different digit is received. That is, the pair of NAND gates will remain latched in their last condition irrespective of the fact that the potential differential between the lines may return to zero.

It is an object of the present invention to provide a new and improved receiver circuit for responding to binary codes.

It is a more specific object of the invention to provide a new and improved circuit for responding to binary codes and which provides self-synchronizing pulses.

It is another more specific object of the invention to provide a new and improved circuit for responding to binary codes which preserves an indication of the last code received until such time as a different code is received.

It is another object of the invention to provide a new and improved circuit for responding to binary data in the form of a return to zero pulse train with differential polarity reversals used to distinguish between binary digits.

It is another object of the invention to provide a new and improved binary data transmission system which provides a snychronizing pulse with each bit.

DESCRIPTION OF THE PREFERRED EMBODIMENT

Figure 1:
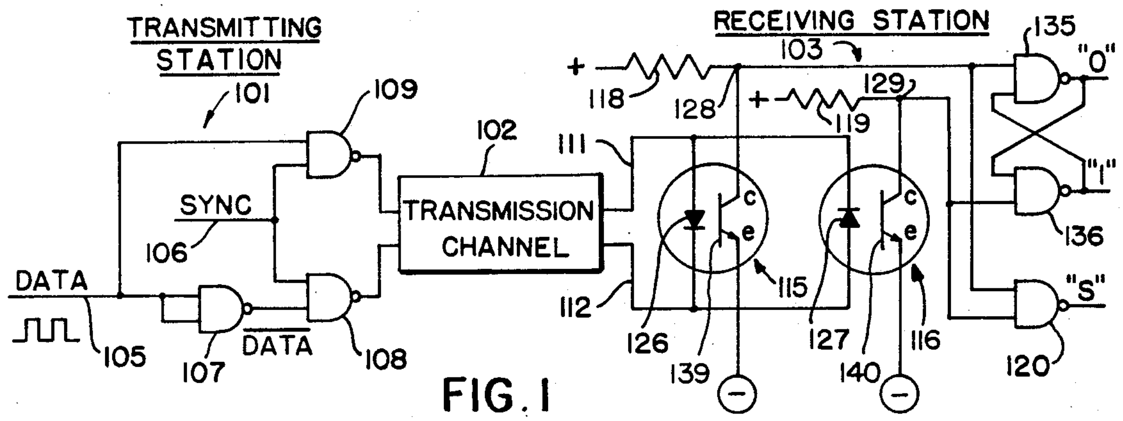
FIG. 1 is a logic diagram of the essential elements of the code receiver.

It is believed that the operation and organization of a system incorporating the invention can best be understood by considering the drawing together with the following specification. Considering now more specifically FIG. 1, there may be seen a transmitting station 101, a transmission channel 102 and a receiving station 103. As will be shown, both the transmitting station 101 and the receiving station 103 include a plurality of NAND gates. A NAND gate may be defined as a logic operator having the property that if A, B, C, . . . are statements, then the NAND of A, B, C, . . . is true if at least one statement is false; false if all statements are true. This is sometimes expressed in terms of what is called a truth table as follows:

| INPUT | OUTPUT |
|---|---|
| TT | F |
| TF | T |
| FF | T |

Or sometimes positive and negative symbols are used thus:

| INPUT | OUTPUT |
|---|---|
| ++ | − |
| +− | + |
| −− | + |

A NAND gate is similar to an AND gate except that the output of an NAND is always the negative of the input when all inputs have the same sense. A modification of the circuit of the present invention could be designed using NOR gates. A NOR gate may be defined as a logic operator having the property that if A, B, C . . . are statements, then the NOR of A, B, C . . . is true if all statements are false; false if at least one statement is true.

The circuit of FIG. 1 also utilizes optical couplers comprising a light emitting diode and a phototransistor. The phototransistor is rendered conducting when current flows through the light emitting diode. That is, when the potential is such as to allow the passage of current through the light emitting diode, there will be a flow of current from the collector to the emitter of the associated phototransistor. The operation of the NAND gates and optical couplers will be discussed more fully hereinbelow in connection with the detailed circuit operation.

Figure 2:
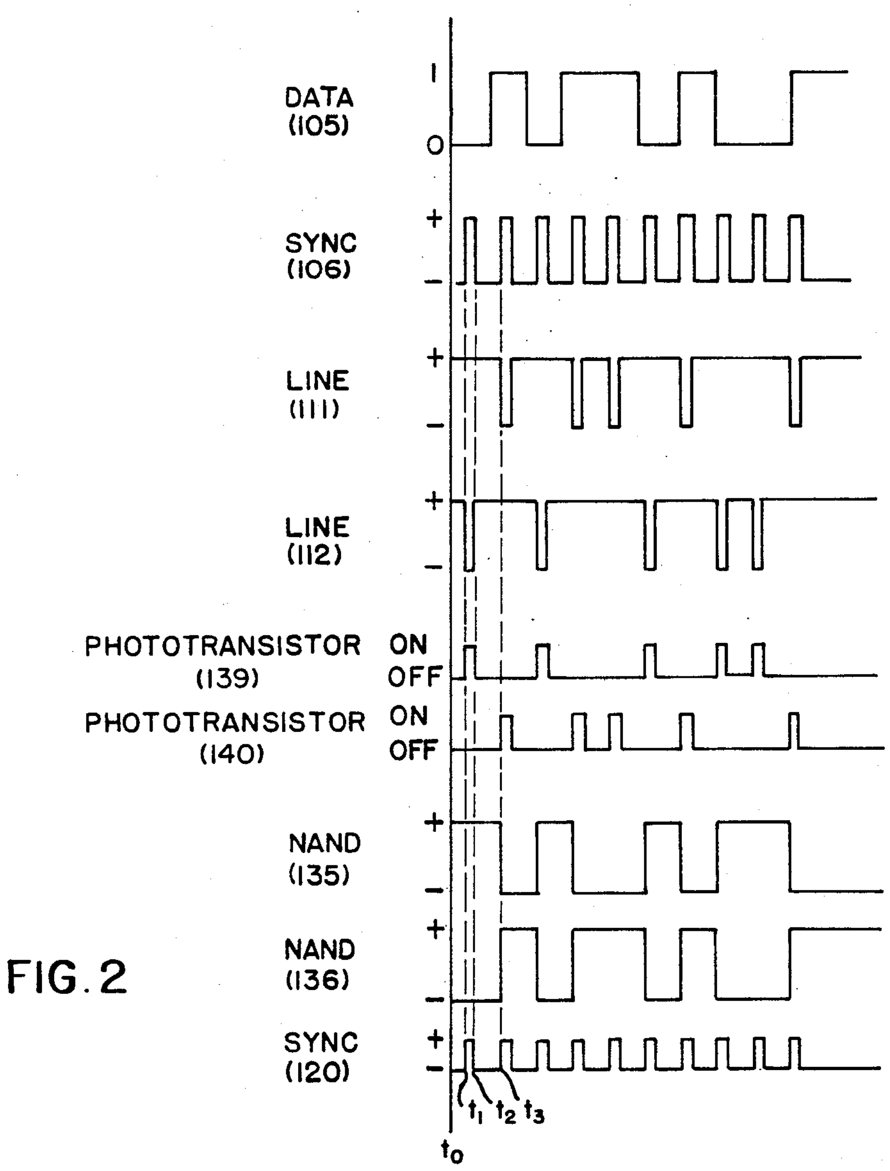
FIG. 2 is a chart which illustrates the status of various elements of FIG. 1 in response to a variety of changes in the input signals.

Considering now more specifically FIG. 1, in combination with FIG. 2, it will be seen that there is a data line 105 to which there is applied a square wave input potential which may take the shape shown on the data line of FIG. 2. More specifically, the data line 105 may vary between upper and lower limits as shown. When the potential of the data line 105 is at a lower limit, binary data representative of a "ZERO" may be represented; while when the data line 105 is at its upper potential, binary data indicative of a "ONE" may be represented. Accordingly, as seen from the shape of the data curve in FIG. 2, the data line 105 may vary between a positive potential and a potential which is negative with respect to the positive potential, to represent binary "ONE" and binary "ZERO", respectively. The potential representative of the binary "ZERO" will be referred to herein as negative.

The data signals may appear on data line 105 at a predetermined rate or a random rate as may be determined by the nature and design of the transmitting station. In either event the transmitting station 101 will cause a synchronizing pulse to be placed on line 106 at approximately the mid-point of each data bit on the data line 105. The pulses on the synchronizing line 106 are shown in FIG. 2. If at time $t_0$ the potential on data line 105 is negative, to indicate a zero bit, as shown in FIG. 2, such zero potential will be applied to NAND gate 107 and since this is the only input to NAND gate 107 the output thereof will be the inverse of the input and a positive potential will be applied to NAND gate 108. The inverse of the DATA signal is designated $\overline{\text{DATA}}$ and is applied as an input to NAND gate 108. The negative potential on the data line 105 will also be applied to NAND gate 109. At time $t_0$ the potential of the synchronizing line 106 will be negative (see FIG. 2) and therefore both the NAND gates 108 and 109 will have additional negative inputs. Because both of the inputs to NAND gate 109 are negative the output of NAND gate 109 will be positive at time $t_0$. The positive output of NAND gate 109 will be applied through transmission channel 102 to line 111. Thus, as may be seen in FIG. 2 at time $t_0$ the potential on line 111 is positive. As already indicated NAND gate 108 has one positive input and one negative input. Accordingly, output of NAND gate 108 will be positive and the potential on line 112 of the transmission channel 102 will be at a positive potential at time $t_0$ as shown in FIG. 2.

Thus, as has been shown at time $t_0$ the potential on lines 111 and 112 will both be positive and there will be a zero potential difference therebetween. With a zero potential difference between the lines 111 and 112 neither of the light emitting diodes 126 or 127 will conduct.

Thus, as has been shown, at time $t_0$, the potential on lines 111 and 112 will both be positive and consequently there will be a zero potential difference therebetween. With a zero potential difference between the lines 111 and 112 neither of the light emitting diodes, 126 or 127 will conduct. Accordingly, there will be no current flow through the light emitting diodes 126 and 127 of either of optical couplers 115 or 116, respectively. And therefore there will be no current from the collectors to the emitters of the phototransistors 139 and 140. Accordingly, the positive potential applied at the left side of the resistors 118 and 119 will be applied as an input to NAND gate 120 and therefore the output of synchronizing NAND gate 120 will be negative at time $t_0$ as shown in FIG. 2.

At time $t_1$ the potential on the synchronizing line 106 will go positive, as shown in FIG. 2, and thereby place a positive input on both of the NAND gates 108 and 109. The NAND gate 108 will now have two positive inputs and therefore its output will go negative. Accordingly, at time $t_1$ the potential on line 112 will go negative as seen in FIG. 2. However, the potential on line 111 will remain positive inasmuch as one input to the NAND gate 109 is positive and the other input is negative. In summary, at time $t_1$ the potential on line 111 remains positive while the potential on line 112 goes negative. In view of the direction of the potential difference between line 111 and 112 there will be a current flow through the light emitting diode 126 of the optical coupler 115. As a result of the light emitted from the light emitting diode 126 the phototransistor 139 will conduct current from its collector to its emitter and the potential at point 128 will go negative. There will be no change in phototransistor 140. With point 128 at a negative potential it will be seen that one of the inputs of NAND gate 120 is negative while the other input is positive. Accordingly, the output of NAND gate 120 will shift from negative to positive at time $t_1$, all as shown in FIG. 2.

From a careful consideration of the circuit of FIG. 1, together with the charts of FIG. 2, it will be seen that at time $t_2$, which is the time that the synchronizing pulse on synchronizing line 106 returns to its negative potential, the output of NAND gate 120 will also return to its negative potential. Thus, as may be seen the output S of NAND gate 120 will duplicate the pulse applied to the synchronizing line 106.

It should also be observed that between time $t_1$ and $t_2$, that is, during the time of the positive synchronizing pulse on synchronizing lead 106, the potential on line 112 went to negative if at the same time the data pulse on the data line 105 was negative.

Consider now a time $t_3$ during which a positive synchronizng pulse appears on the synchronizing line 106 and during which the potential of the data line 105 is also positive. With a positive potential on the data line 105 a positive input will be applied to NAND gate 109 and with the positive synchronizing signal on synchronizing line 106 a second positive input will be applied to NAND gate 109. Accordingly, the transmission line 111 will be negative as shown in FIG. 2. At the same time, namely time $t_3$, the NAND gate 107 will invert the positive potential applied to data line 105 and cause a negative input to be applied to NAND gate 108. At this same time, namely time $t_3$, a positive input will be applied to the NAND gate 108 from the synchronizing line 106. Accordingly, the output of NAND gate 108 will be positive and the potential of line 112 will remain positive as shown in FIG. 2. Thus, at time $t_3$, the line 112 is positive while the line 111 is negative and there will be a current flow through the LED 127 associated with optical coupler 116. As a result of the current through LED 127 light will be emitted and the phototransistor 140 will conduct current from its collector to its emitter and the potential at point 129 will go negative. At the same time, namely time $t_3$, point 128 will be at a positive potential. Accordingly, one of the inputs to NAND gate 120 is positive while the other input is negative. Accordingly, the output of NAND gate 120 wil be positive. This condition is shown in FIG. 2 as a positive pulse on the curve representing the output of NAND gate 120.

In summary it has been shown that the output of the NAND gate 120 will duplicate the synchronizing pulse on the synchronizing line 106. In addition, it has been shown that when there is a potential difference between the lines 111 and 112 there will be a current flow through one or the other of the LEDS 126 and 127. The particular LED which is rendered conducting will be a function of which one of the lines 111 or 112 is positive with respect to the other. More particularly, when the data line 105 is at a negative potential and there is a synchronizing pulse on synchronizing line 106, the photogtansistor 139 will be turned on and point 128 will be reduced to a negative potential. Conversely, if there is a positive potential on the data line 105 and there is a positive synchronizing pulse on the synchronizing ine 106 the phototransistor 140 will be turned on and the point 129 will be reduced to a negative potential.

Considering now more specifically the NAND gates 135 and 136 it will be seen that one of the inputs of NAND gate 135 is derived from the potential at point 128; and that one of the inputs of NAND gate 136 is derived from the potential at point 129. Accordingly, the specified input of NAND gates 135 and 136 may be selectively shifted between positive and negative potentials and such action will take place in an orderly fashion which is dependent upon the signal applied to the data line 105 at the time that a synchronizing pulse appears on the synchronizing line 106.

It will also be seen that each of the NAND gates 135 and 136 has a second input which is directly derived from the output of the other NAND gate. Considering now more specifically the input of NAND gate 135 and 136 at time $t_1$, it will be seen that one input to NAND gate 135 will be negative because point 128 is negative at time $t_1$. In a similar manner, at time $t_1$, one input to NAND gate 136 will be positive because the potential of point 129 is positive. A careful consideration of the possible outputs of NAND gates 135 and 136 will disclose that the output of NAND gate 135 is positive and that the output of the NAND gates 136 is negative. Any other assignment of outputs for NAND gates 135 and 136 would produce inconsistent and/or incompatible results. Because of the way the output of NAND gate 135 is coupled as an input to NAND gate 136, and the output of NAND gate 136 is coupled as an input of NAND gate 135 it will be seen that NAND gate 135 has two negative inputs and NAND gate 136 has two positive inputs. Accordingly, with two negative inputs for NAND gate 135 the output thereof will be positive, and with two positive inputs for NAND gate 136 the output thereof will be negative. Therefore, as shown in FIG. 2 at time $t_1$ the output potential of NAND gate 135 is positive while the output potential of NAND gate 136 is negative. At time $t_2$, the potential at point 128 will be restored to a positive potential thereby changing one of the inputs to NAND gate 135. However, notwithstanding this change in the input to NAND gate 135 the outputs thereof remains positive. That is, although the potential at point 128 has shifted from negative to positive thereby providing one positive input to NAND gate 135 the other input of NAND gate 135 is negative and under these conditions the output of NAND gate 135 will be positive which is the same output that the NAND gate 135 had before the change of the potential at point 128.

In summary, the appearance of the positive synchronizing pulse on synchronizing lead 106 set up a particular condition on the output of NAND gates 135 and 136 but the removal of the positive pulse on the synchronizing lead 106 did not alter the condition on the output leads of NAND gates 135 and 136.

The next change on the output of one or the other or both of NAND gates 135 and 136 will occur at time $t_3$ which is the time of the next synchronizing pulse of synchronizing lead 106. At time $t_3$ the potential at point 129 will go negative and thereby provide a negative input to NAND gate 136. Since NAND gate 136 already has one positive input from the output of NAND gate 135, the output of NAND gate 136 will shift from negative to positive thereby providing a second positive input to NAND gate 135. With two positive inputs to NAND gate 135 the output thereof will be negative and accordingly at time $t_3$ the output of NAND gate 135 will shift from positive to negative. At the end of time $t_3$ when point 129 is returned to a positive potential the NAND gate 136 will have one negative input and one positive input. Under these conditions the output of NAND gate 136 will remain positive.

In summary, it has again been shown that although a positive pulse on sychronizing lead 106 may trigger a change in the output of NAND gates 135 and 136, the output of these NAND gates will not be altered in response to the removal of the positive pulse on the synchronizing lead 106. Phrased differently the NAND gates 135 and 136 comprise a latch such that they will hold each other in the last condition to which they have been triggered.

If positive and negative signals on the data line 105 are thought of as the "One" and "Zero" binary digits, respectively, it will be seen that in response to each positive or "One" pulse on the data line 105, the output of NAND gate 136 will be driven positive; and that in response to each negative or "zero" pulse on data line 105 the output of NAND gate 135 will be driven positive. It should be observed that when there are two successive "Ones" or "Zeros" being transmitted from the transmitting station 101 to the receiving station 103 that there is no change in the output of the NAND gates 135 and 136. It should also be observed that the potential differential between the lines 111 and 112 exist only during the time that a synchronizing pulse is placed on synchronizing line 106. That is, the potential difference between the lines 111 and 112 exists for only a brief interval but the output signals of NAND gates 135 and 136 are latched to indicate the nature of the last bit transmitted.

While there has been shown and described what is considered at present to be the preferred embodiment of the invention, modifications thereto will readily occur to those skilled in the related arts. For example, in another circuit AND gates and inverters could be substituted for the NAND gates or, by appropriate modifications, NOR gates could be substituted for the NAND gates. It is believed that no further analysis or description is required and that the foregoing so fully reveals the gist of the present invention that those skilled in the applicable art can adapt it to meet the exigencies of their specific requirements. It is not desired, therefore, that the invention be limited to the specific embodiments shown and described, and it is intended to cover in the appended claims all such modifications as fall within the true spirit and scope of the invention.

What is claimed is:

1. A binary data receiver comprising in combination:

a. a data transmission channel having first and second lines for coupling a transmitting station to a receiving station;

b. control gate means and detecting means at said receiving station and coupled to said first and second lines to cooperate for producing a signal responsive to either of said first or second lines being rendered positive with respect to the other;

c. first and second gate means coupled to said transmission channel and said detecting means for producing a first distinctive output signal in response to said first line being rendered positive with respect to said second line and for producing a second distinctive output signal in response to said second line being rendered positive with respect to said first line; and d. intercoupling means between said first and second gate means for causing them to preserve said first or second distinctive output signals irrespective of the potentials applied to said first and second lines, until the potentials applied to said first and second lines are such as to reverse the potentials therebetween.

2. The combination as set forth in claim 1 wherein said detecting means comprise first and second optical couplers.

3. The combination as set forth in claim 1 wherein said first and second gate means comprise NAND gates.

4. The combination as set forth in claim 1 wherein said control gate has as first and second inputs thereto signals which correspond to an input to said first and second gates, respectively.

5. The combination as set forth in claim 1 wnerein said transmitting station includes:

a. a data signal lead which is switched between first and second potentials for representing the first and second bits of binary data; and b. a synchronizing lead which is pulsed once per bit.

6. A code receiver for receiving binary codes transmitted over a line pair with differential polarity reversal used to distinguish between the binary bits and comprising in combination:

a. first and second detecting means bridged across said line pair for responding to polarity differences in first and second directions between the lines of said line pair;

b. first and second gate means coupled to said first and second detecting means, respectively, for producing a distinctive output signed each time said first or second detecting means responds to a polarity difference; and c. third gate means coupled to said first and second detecting means and responsive to each polarity reversal between the lines of said line pair for producing a distinctive output signal; and wherein d. said first and second gate means have their outputs coupled as an input to said second and first gate means, respectively, for latching the respective first and second gate means so that they preserve a continuous output signal irrespective of the potential between the lines of said line pair until such time as a potential reversal between the lines of said line pair is detected by said first and second detecting means.

7. The combination as set forth in claim 6 wherein said first and second detecting means comprise optical couplers.

8. The combination as set forth in claim 6 wherein said first and second gate means comprise NAND gates.

9. A binary data transmission system comprising in combination:

a. a data signal having first and second potential levels for indicating the first and second bits, respectively, of binary data;

b. an inverter for providing an inverse signal which is the inverse of said data signal;

c. first and second gates with said first gate having said data signal applied as an input and with said second gate having said inverse signal applied as an input;

d. a pulsed synchronizing signal coupled as an input to both said first and second gates for causing said first and second gates to generate;

1. an output signal such that said first and second gates generate positive and negative output signals, respectively, when said data signal is at said first potential level and said synchronizing signal is pulsed; and
2. an output signal such that said first and second gates generate negative and positive output signals, respectively, when said data signal is at said second potential level and said synchronizing signal is pulsed;

e. a two channel data transmission line having one channel coupled to the output of said first gate and the other channel coupled to the output of said second gate;

f. detecting means coupled to said transmission line for providing first and second characteristic signals indicative of the instantaneous potential difference between the channels of said transmission line; and g. signal interpreting gate means coupled to said detecting means for:

1. generating a first code when and if there is a potential difference between the channels of said transmission line;
2. generating a second code indicative of the direction of the polarity difference between said one channel and said other channel of said transmission line; and
3. maintaining said second code irrespective of the then instantaneous potential difference between the channels of said transmission line until such time as there is a reversal in the polarity, of the potential difference between said one channel and said other channel of said transmission line.

* * * * *